United States Patent

[11] 3,601,032

| [72] | Inventor | Robert R. Lambert |
| | | Glendora, Calif. |
| [21] | Appl. No. | 848,202 |
| [22] | Filed | Aug. 7, 1969 |
| [45] | Patented | Aug. 24, 1971 |
| [73] | Assignee | Air Factors, Inc. |
| | | Covina, Calif. |

[54] MOUNTING STRUCTURE FOR DUCTBOARD PLENUM CHAMBER ASSEMBLY
9 Claims, 6 Drawing Figs.

| [52] | U.S. Cl. | 98/40 D |
| [51] | Int. Cl. | F24f 13/04 |
| [50] | Field of Search | 98/40 DL, 40 D, 40 C; 138/106, 107 |

[56] References Cited
UNITED STATES PATENTS

| 3,108,529 | 10/1963 | Sweetser | 98/40 DL |
| 3,320,869 | 5/1967 | Schach | 98/40 D |
| 3,419,714 | 12/1968 | Slaver | 98/40 DL |

*Primary Examiner*—Meyer Perlin
*Assistant Examiner*—Ronald C. Capossela
*Attorney*—Miketta, Glenny, Poms and Smith ABSTRACT: A mounting structure means for mounting air-directing means within an air plenum chamber duct assembly of folded ductboard, mounted upon an air diffuser assembly, comprising a support body of preformed sheet metal formed in the general shape of the interior of the duct to be held in fixed relation therein by the interengagement of corresponding surfaces. The body has flanges which extend under clips or into slitlike openings in the duct to aid in maintaining the body in position. The body mounts an air inlet collar and/or air vanes of either channel or angle cross section to direct the air from the inlet to the outlet of the plenum chamber duct assembly and through the air diffuser assembly.

Patented Aug. 24, 1971 3,601,032
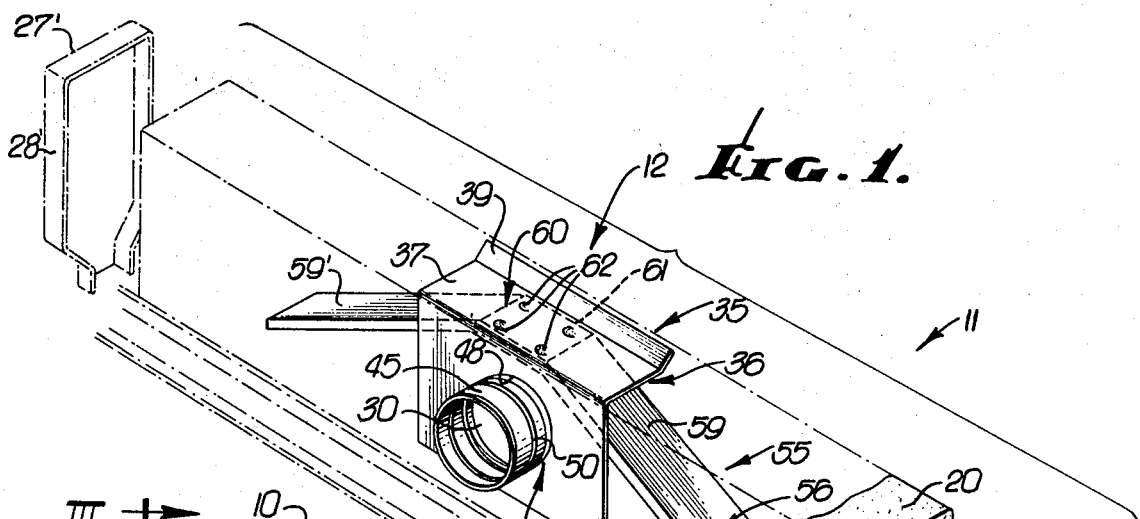
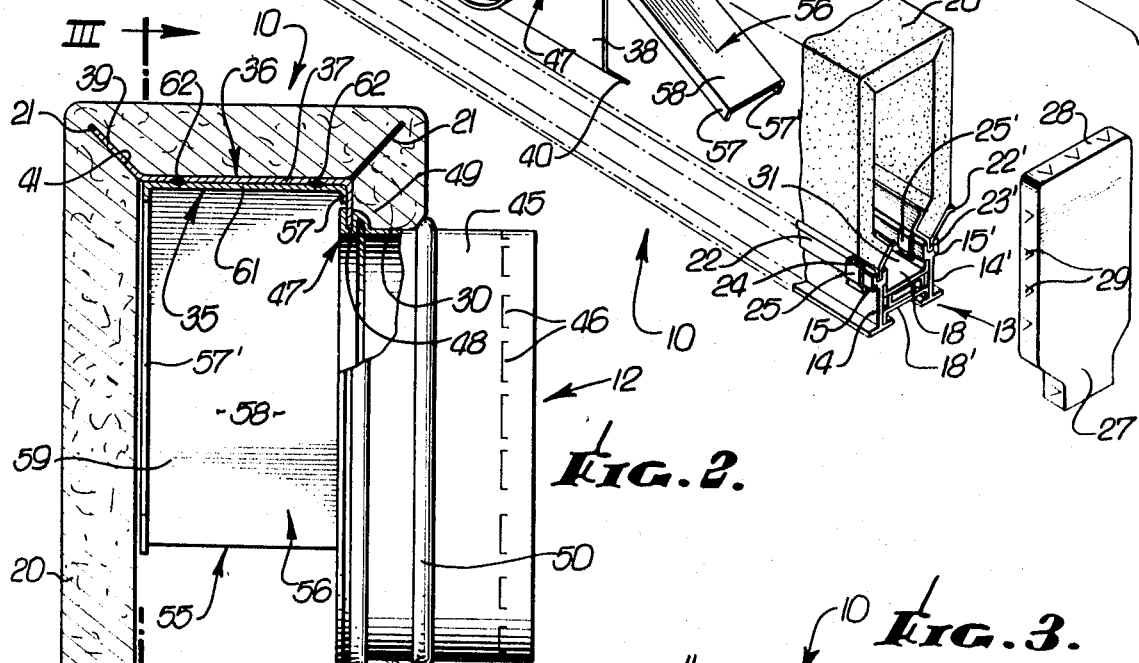
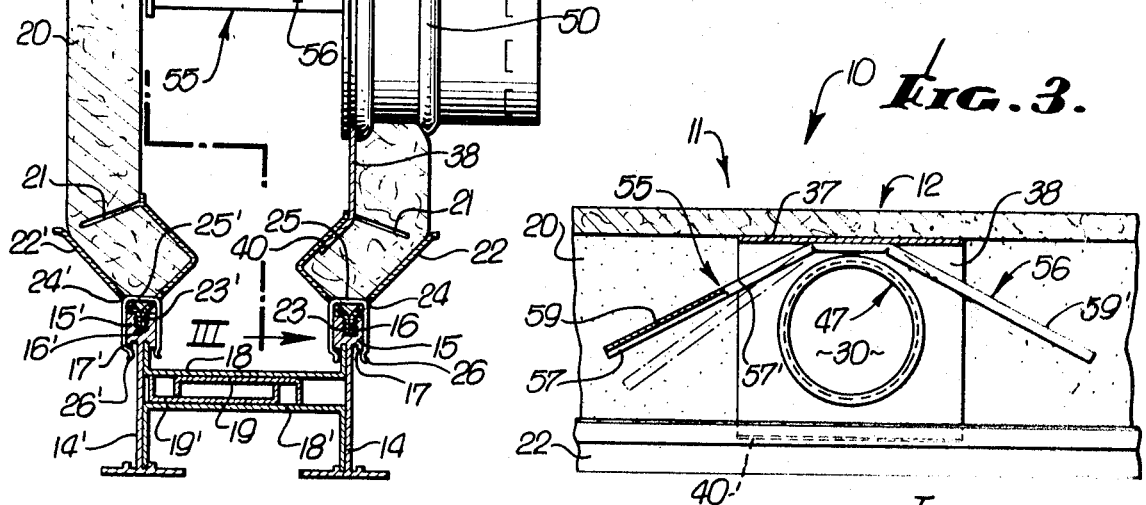
INVENTOR.
ROBERT R. LAMBERT
By
Mikesell, Glenny, Pome & Smith
ATTORNEYS.

Patented Aug. 24, 1971
3,601,032
2 Sheets-Sheet 2
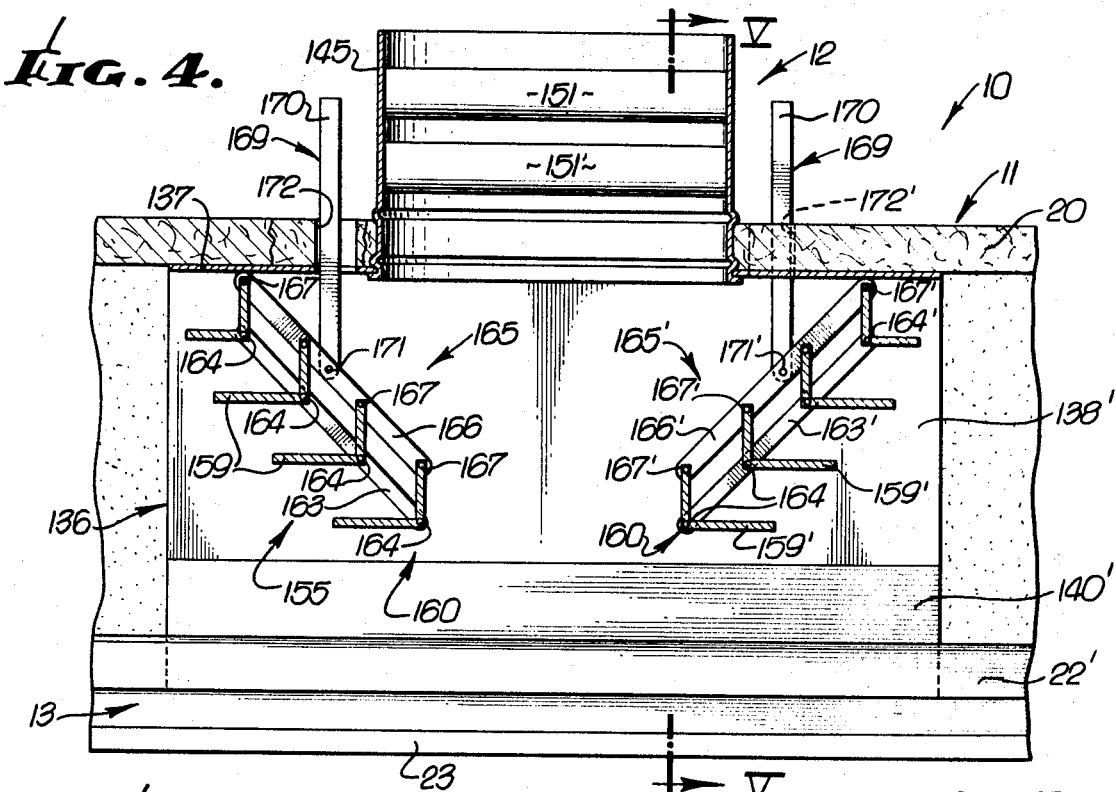
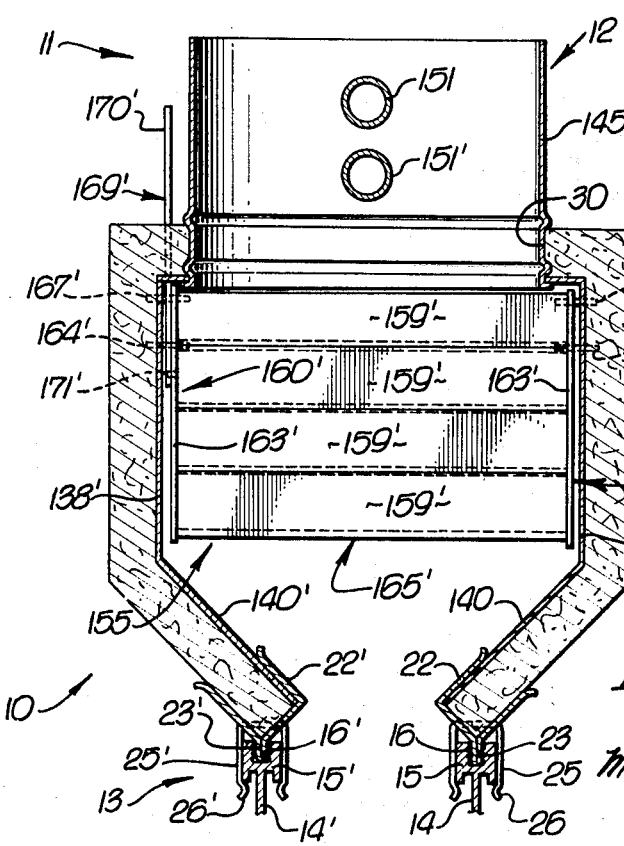
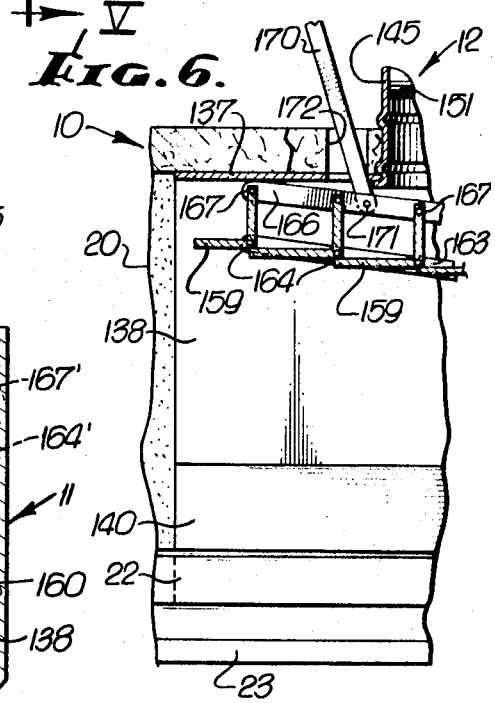
INVENTOR.
ROBERT R. LAMBERT
By
Miketta, Glenny, Poms & Smith
ATTORNEYS.

3,601,032

MOUNTING STRUCTURE FOR DUCTBOARD PLENUM CHAMBER ASSEMBLY

BACKGROUND OF THE INVENTION

This invention relates to mounting structures and more particularly to a mounting structure for mounting air-directing means within an air plenum chamber duct constructed of folded insulation board and used in an air distribution system.

Heating and ventilating air distribution systems require a plenum chamber or chambers to collect the air from the source of supply and distribute it into an associated room area. These plenum chambers are generally elongated, round or boxlike enclosures which contain an air inlet and an air outlet.

In all heating and ventilating applications but most particularly in the field of air conditioning, it is desirable to provide an air plenum chamber which is insulated against the surrounding air to prevent heating or cooling losses through the sides of the chamber before the air is distributed therefrom into the room. One obvious way to provide this insulation for the air plenum chamber is to make the chamber out of conventional insulation board. The insulation board can be folded into a variety of shapes and provides adequate insulation for the air plenum chamber. However, the insulation board is not readily adaptable to the use of air directing means mounted to or within the air plenum chamber itself. There, I have found that special mounting structure must be provided within an air plenum chamber, made of insulation board, to properly mount air-directing means thereto.

It is a primary object of this invention to provide a mounting structure for use within an air plenum chamber made of insulation board which mounts air-directing means therein such as inlet collars and movable air vanes.

It is another object of this invention to provide such a mounting structure with flanges which extend under the clips used to mount the insulation board air plenum chamber upon an air diffuser assembly.

It is yet a further object of this invention to provide such a mounting structure with flanges which extend into slitlike openings in the insulation board.

It is yet a further object of this invention to provide a mounting structure with such flanges extending into slitlike openings formed at the folds of the insulation ductboard by the sides of relief notches, cut in the insulation board to facilitate the folding thereof.

SUMMARY OF THE INVENTION

Generally stated, the present invention provides a support body preformed out of a deformable material which is positioned within an air plenum chamber duct of folded insulation board. The support body is supported therein by the engagement of three or more surfaces of the support body with interior surfaces of the folded duct. The support body mounts air directing means, such as an air inlet collar or air vanes, to vary the direction of the air distribution within the plenum chamber from said inlet toward the outlet. The support body is preferably provided with flanges which aid in securing the support body to the insulation ductboard by extending into slitlike openings in the duct or by extending underneath clips used to mount the duct on an air diffuser assembly.

These and other various advantages and distinctive characteristics of the present invention will become apparent to those skilled in the art from the following description of a preferred and alternative exemplary embodiment of the mounting structure for a ductboard air plenum chamber according to the present invention. In such description, reference will be had to the appended drawings wherein:

BRIEF DESCRIPTION OF THE DRAWINGS

FIG. 1 is a perspective view of an air plenum chamber duct assembly constructed of folded insulation board, mounted upon an air diffuser assembly, and partially cut away to show a first preferred exemplary embodiment of the mounting structure means, according to the present invention for mounting an inlet collar and a pair of air vanes;

FIG. 2 is a cross-sectional view of the air plenum chamber duct assembly and mounting structure means of FIG. 1;

FIG. 3 is a cross-sectional side elevation view of the assembly and structure means of FIG. 2 taken therein along the stepped plane III—III;

FIG. 4 is a side elevation cross-sectional view of an alternative exemplary embodiment of the mounting structure means according to the present invention;

FIG. 5 is a cross-sectional view taken along the plane V—V of the alternative exemplary embodiment of mounting structure means of FIG. 4; and FIG. 6 is a sectional view of a portion of the structure means of FIG. 4.

DESCRIPTION OF THE PREFERRED EMBODIMENTS

Referring now particularly to FIG. 1, an air distribution system, indicated generally at 10, is of the type disclosed in my corresponding U.S. patent application Ser. No. 815,835. The air distribution system 10 includes an air plenum chamber duct assembly 11 containing air-directing means 12 therein, and mounted upon an air diffuser assembly, indicated generally at 13.

The air diffuser assembly 13 may include a pair of inverted T-bar members 14, 14' of the type used to support a suspended ceiling of ceiling tile or acoustical board. The inverted T-bar members 14, 14' each include an upper head 15, 15' respectively containing an upwardly opening longitudinal slot 16, 16' and a pair of opposite shoulders 17, 17'. The inverted T-bar members 14, 14' are spaced apart by a pair of U-shaped channel spacers 18, 18' which mount nested U-shaped channel members or weir set 19, 19' to control the direction, velocity and volume of air discharge as disclosed in U.S. Pat. No. 3,411,425.

The air plenum chamber duct assembly 11 includes an open-ended duct 20 insulation ductboard which is relieved with longitudinal V-shaped grooves 21 and folded at the grooves 21 into a boxlike cross-sectional shape, open at the bottom. Each of the lower edges of the duct 20 is inserted into a ductboard keeper channel 22, 22' with a downwardly extending longitudinal flange 23, 23' and a series of spaced openings 24, 24' in the channel 22, 22' above the flange 23, 23', respectively. A spring clip 25, 25' with opposed clip feet 26, 26' is inserted through each opening 24, 24', respectively.

As shown in FIG. 1, the air plenum chamber duct assembly 11 is completed by the addition at each end of end plates 27 and 27' having folded flanges 28, 28' respectively, extending over the sides of the ductboard 20. The flanges 28, 28' have inwardly bent notches or barbs 29, 29' which catch into the resilient insulation ductboard. The lower portions of the flanges 28, 28' extend under the ductboard keeper channels 22, 22' to maintain the end plates 27, 27' thereon.

When the plenum chamber duct assembly 11 is mounted on the air diffuser assembly 13, each of flanges 23, 23' of the ductboard keeper channels 22, 22' enter the corresponding slot 16, 16' in the upper head 19, 19' of the corresponding inverted T-bar member 14, 14'. The clip feet 26, 26' of the spring clips 25, 25' respectively, latchingly engage the shoulders 17, 17' of the upper head 21, 21' of the inverted T-bar member 14, 14' to secure the plenum chamber duct assembly 11 to the diffuser assembly 13.

The plenum chamber assembly 11 has an inlet opening 30 through the insulation board, and an outlet opening 31 through the open bottom of the plenum chamber assembly 11, and through the spaced T-bar members 14, 14' of the air diffuser assembly 13.

The preferred embodiment of mounting structure means, according to the present invention, is indicated generally at 35 in FIG. 1 and is intended for use in an air distribution system of the type thus far explained. The preferred exemplary embodiment is shown in FIGS. 1, 2 and 3, the preferred exemplary embodiment of the mounting structure means 35 comprises a support body 36 preformed out of a sheet of deformable material such as sheet metal or plastic into a horizontal plate portion 37 joined to a vertical plate portion 38 at the common edge thereof. Each of the horizontal and vertical plate portions 37 and 38, has a bent opposite edge forming flange, 39 and 40 respectively. The cross-sectional shape of the support body 36 is such as to correspond to the interior shape of the air plenum chamber duct assembly 11 so that when the support body 36 is positioned within the duct assembly 11, the body 36 is held in generally fixed relationship therein by the engagement of the plate portions 37 and 38 and the flanges 39 and 40 with the corresponding surfaces of the air plenum chamber duct assembly 11.

In order to assure that the support body 36 will be maintained in a proper position within the air plenum chamber duct assembly 11, the flange 40 of the vertical plate portion 38 is inserted under the ductboard keeper channels 22 as is best seen in FIG. 2. The flange 39 of the horizontal plate portion 37 is correspondingly inserted into a slitlike opening 41 in the ductboard. The slitlike opening 41 could be cut in the ductboard, but as best seen in FIG. 3, slitlike openings 41 already exist at the folded corners of the air plenum chamber duct assembly 11 because of the folding of the duct 20 at the V-shaped grooves 21. These slitlike openings 41 at the folded corners of the duct 20 provide a convenient opening for the flange 39 and are therefore used to maintain the extending flange 39 in its proper position.

The mounting structure means 35 mounts the air-directing means 12 within the air plenum chamber duct assembly 11. The air-directing means may include an air inlet collar 45 and/or air vane means 55. The air inlet collar 45 is generally tubular in shape and has adjacent its outward end, barbs 46 for connecting to a conventional flex duct sleeve (not shown). The support body 36 has mounting means associated therewith indicated generally by the number 47 for mounting the inlet collar 45. The mounting means 47 includes an opening 48 in the vertical plate portion 38 adjacent the inlet opening 30 of the plenum chamber duct assembly 11 and a flange and bead combination 49 on the inward end of the air inlet collar 45 which when the air inlet collar 45 is inserted through the opening 48 and out through the inlet opening 30, cooperates with the vertical plate portion 38 to hold the air inlet collar 45 in position. The mounting means 47 also includes a bead 50 centrally located on the air inlet collar which engages the outside of the duct 20 to help in locating the air inlet collar 45.

The mounting structure means 35 also has air vane means 55 mounted thereto by mounting means 60. In the preferred embodiment shown in FIGS. 1, 2 and 3, the air vane means 55 and mounting means 60 are constructed of a conventional U-shaped channel member 56 including side flanges 57, 57' and a planar web 58. The channel member 56 has a pair of oppositely extending vanes 59, 59', each pivotally mounted to a base 61 which is spot welded at 62 to the horizontal plate portion 37 of the support body 36. In the preferred embodiment, the flanges 57, 57' of the channel member 56 relieved by V-notches 63, 63' enabling the web 58 to flex and provide the pivotal mounting between the vanes 59, 59' and the base 61.

The vanes 59, 59' have a width between the side flanges 57, 57' which is slightly greater than the normal width between the opposite inner surfaces of the plenum chamber duct assembly 11, causing interference fit therebetween when the vanes 59, 59' are inserted therein. The interference fit maintains the vanes 59, 59' in any selected position of adjustment within the duct assembly 11.

A stream of air enters through the inlet collar 45 and is directed thereby against the air vanes 59, 59' which, in turn, direct it at an angle out through the outlet opening 31 in the bottom of the plenum chamber duct assembly 11. The amount, direction, and velocity of air directed out of the outlet opening 31 is dependent upon the position of the vanes 59, 59' and on the position of the weir set 19, 19'. If the vanes 59, 59' and weir set 19, 19' are in the position shown in FIGS. 1 and 3, the majority of the air is directed out toward the outlet opening 31 at a wide angle to spread evenly throughout the room. However, if the vanes 59, 59' are in a raised position, flush with the top wall of the plenum chamber duct assembly 11, the air exits downwardly straight out the outlet opening 31 and does not spread evenly through the room.

FIGS. 4, 5 and 6 show an alternative embodiment of the mounting structure means 35 wherein the inlet opening 30 is vertical. In the alternative embodiment, a support body 136 is again preformed out of a sheet of deformable material such as sheet metal or plastic and includes a horizontal plate portion 137 to which is joined at each side-edge thereof, a vertical plate portion 138, 138'. Each vertical plate portion 138, 138' has at its lower end an inwardly extending flange 140, 140'.

The cross section of the support body 136 generally conforms to the interior shape of the air plenum chamber duct assembly 11, and when the support body 136 is positioned within the duct assembly 11, it is held in generally fixed relationship therein through the engagement of the plate portions 138, 138' and the flanges 140, 140' with the corresponding interior surfaces of the duct assembly 11. To further insure that the support body 136 will maintain its position within the duct assembly 11, the inwardly extending flanges 140, 140' are inserted under respective ductboard keeper channels 22, 22' as is best shown in FIG. 5.

The support body 136 mounts air directing means 12 within the air plenum chamber duct assembly 11. The air-directing means includes an air inlet collar 145 which is identical to the air inlet collar 45 of the preferred embodiment except for a pair of horizontal metering tubes 151, 151' not here important, and air vane means 155 pivotally mounted to mounting means 160 associated with the support body 136.

The air vane means 155 includes two sets of a plurality of air vanes 159, 159' with each vane thereof having a right-angle cross section. The mounting means 160 is a bar 163, 163' pinned at 164, 164' to each end of each air vane 159, 159' at the intersection of the two legs thereof to provided pivotal means. The upper end of the bar 163, 163' is mounted by the upper pin 164, 164' to the vertical plate portions 138, 138' to permit the rotation of the arms 163, 163' thereabout.

The set of air vanes 159, 159' have correlating means indicated generally at 165 attached between each vane of the set for maintaining each of the vanes 159, 159' in correspondence with the balance of the vanes of that set. In the alternative embodiment, the correlating means 165, 165' includes a bar 166, 166' at each end of the vanes 159, 159' and pinned at 167, 167' to the outer end of a leg of each of the vanes 159, 159'. The upper end of the bar 166, 166' is pinned by the upper pin 167, 167' to the vertical plate portions 138, 138' to permit the rotation of the arms 166, 166' thereabout. The bars 166, 166' and 163, 163' respectively, form a parallelogram for moving the sets of vanes in unison.

The air vane means 155 also includes moving means indicated generally at 169 for moving the sets of vanes 159, 159' between various positions, comprising a drive bar 170, 170' pinned at 171, 171' to one of the bars 166, 166'. The drive bar 170, 170' extends out of the plenum chamber assembly 11 through the opening 172, 172' therein.

Movement of the drive bar 169, 169' pivots the bars 166, 166' and 163, 163' about the upper pins 167, 167' and 164, 164' respectively, to move the vanes 159, 159' from the open position shown in FIG. 4 where the majority of air coming through the air inlet collar 145 is directed toward the outlet opening 31, to the closed position of FIG. 6 where the air from the inlet collar 145 is blocked from the outlet opening 31.

Thus the mounting structure of this invention mounts an air directing means 12 within an air plenum chamber duct assembly 11 constructed of resilient insulated ductboard and mounted upon an air diffuser assembly 13.

I claim:

1. A mounting structure means as part of an air distribution system for mounting air-directing means to an air plenum chamber duct of folded insulation board mounted upon an air diffuser assembly, said plenum duct having an air inlet and an air outlet to said diffuser assembly, said structure comprising:
   a support body preformed out of a sheet of deformable material and positioned within said duct, said body being held in generally fixed relation therein through engagement with three or more surfaces of said folded duct.

2. A mounting structure means as in claim 1 wherein:
   said support body positioned within said duct is provided with at least one end flange, and clip means are provided for holding said end flange to said duct.

3. A mounting structure means as recited in claim 1 wherein:
   said support body positioned within said duct is provided with at least one end flange and the duct is provided with at least one slitlike opening, said flange being positioned with the slitlike opening.

4. A mounting structure means as recited in claim 3 wherein:
   said slitlike opening in the duct is formed by a fold of the ductboard.

5. The mounting structure means of claim 1 wherein said air-directing means comprises:
   an air inlet collar and said support body has mounting means associated therewith, including an opening therein, for mounting said inlet collar on said body with said collar projecting from within the plenum chamber duct outwardly through said air inlet.

6. The mounting structure means of claim 1 wherein said air-directing means comprises:
   air vane means for selectively changing the direction of the air distribution from said inlet toward said outlet and mounting means for mounting said air vane means to said support body.

7. The mounting structure means of claim 6 wherein:
   said air vane means comprises a pair of oppositely directed vanes of channellike cross section including side flanges and a planar web, said flanges having a width slightly greater than the normal distance between opposite inner surfaces of said duct and being interposed therebetween in an interference fit,
   said mounting means for mounting said air vane means to said support body mounts said vanes to pivot between various positions within said duct; and
   said interference fit maintains said vanes in any selection position of adjustment within said duct.

8. The mounting structure means of claim 6 wherein:
   said air vane means comprises a multiplicity of angle vanes,
   said air-vane-mounting means for mounting said air vane means to said performed support body comprises pivotal mounting means pivotally mounting the vanes between opposite sides of the duct for movement between various positions and correlating means attached to each vane for obtaining a correspondence between the vane positions; and
   moving means for moving the vanes between various vane positions.

9. A mounting structure means as part of an air distribution system for mounting air-directing means within an air plenum chamber duct of folded insulation board mounted upon an air diffuser assembly, said plenum duct having an air inlet and air outlet to said diffuser assembly, said structure comprising
   a support body preformed out of a sheet of deformable material, said sheet having three or more generally planar surfaces, the generally planar surfaces of said body being in engagement with a like number of separate longitudinal generally planar surface on the duct to hold the body longitudinally in generally fixed relation with the duct.